United States Patent [19]
Nakade

[11] Patent Number: 6,084,709
[45] Date of Patent: Jul. 4, 2000

[54] DELINEATOR CAPABLE OF REFLECTING OBLIQUE INCIDENT LIGHT BEAM

[75] Inventor: Hiroshi Nakade, Higashiosaka, Japan

[73] Assignee: Cateye Co. Ltd., Osaka, Japan

[21] Appl. No.: 09/103,030

[22] Filed: Jun. 23, 1998

[30] Foreign Application Priority Data

Jun. 27, 1997 [JP] Japan .................................. 9-171500

[51] Int. Cl.[7] .................................................. G02B 5/124

[52] U.S. Cl. ......................... 359/532; 359/547; 359/552; 404/6; 404/7; 404/9

[58] Field of Search ..................................... 359/529–532, 359/547, 551–552; 404/14, 16, 6, 7, 9; 116/63 R

[56] References Cited

U.S. PATENT DOCUMENTS

| 4,349,598 | 9/1982 | White ....................................... 428/161 |
| 5,049,001 | 9/1991 | Dinitz .......................................... 404/7 |

*Primary Examiner*—James Phan
*Attorney, Agent, or Firm*—Olson & Hierl Ltd.

[57] ABSTRACT

A delineator easily recognized by the driver even when attached at a moderate curve of a road includes colorless transparent reflectors attached inclined by a prescribed angle with respect to an aluminum base and amber transparent reflectors attached inclined in the opposite direction. Each reflector has a reflex reflecting element, an optical axis of which is inclined in the same direction as the corresponding reflector. Thus light beams entering in a direction parallel to the surface on which the delineator is attached can also be reflected.

11 Claims, 16 Drawing Sheets

DELINEATOR CAPABLE OF REFLECTING OBLIQUE INCIDENT LIGHT BEAM

BACKGROUND OF THE INVENTION

1. Field of the Invention

The present invention relates to a delineator and, more specifically, a delineator attached to an object such as a guardrail placed along the road for giving a notice to the driver as to where the road leads to.

2. Description of the Background Art

A delineator has been conventionally known which is attached to a guardrail or a wall surface provided along the road for giving notice to the driver, by reflecting light from a head lamp of a car, for example, to a direction opposite to the incident direction.

Figure 14:
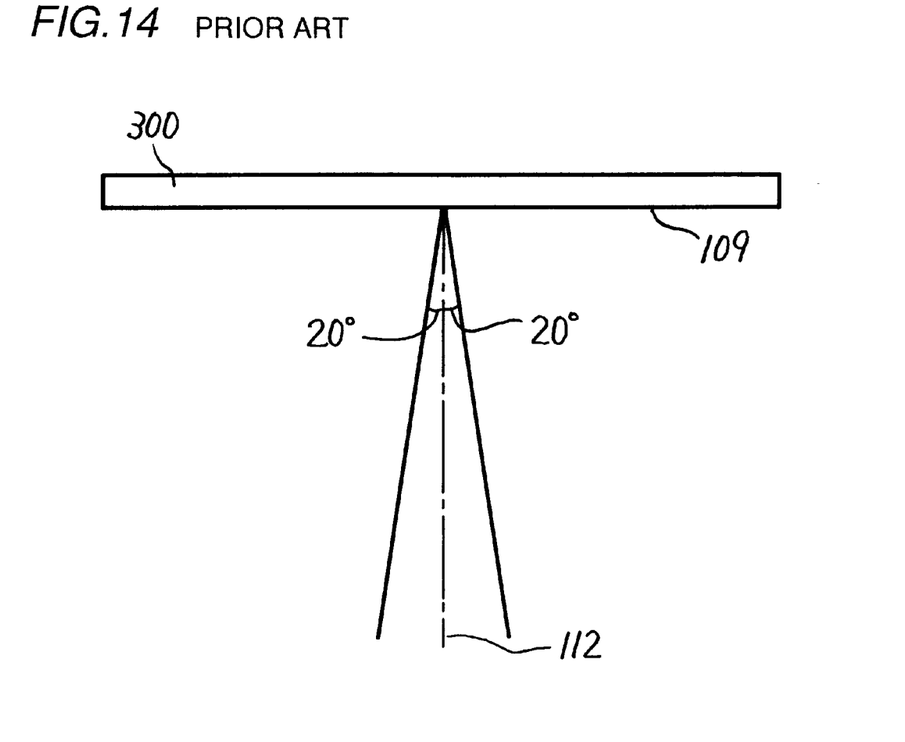
FIG. 14 is an illustration related to the effective incident angle of the conventional delineator.

FIG. 14 illustrates the function of such a delineator 300. Referring to the figure, delineator 300 includes a mirror finished surface portion (refracting surface) 109, and reflects incident light beam from perpendicular direction 112 of mirror finished surface portion 109 to the opposite direction. The angle within which the incident light beam can be reflected (effective incident angle) is 20° each in left and right directions with respect to perpendicular 112 of the mirror finished surface portion.

Figure 15:
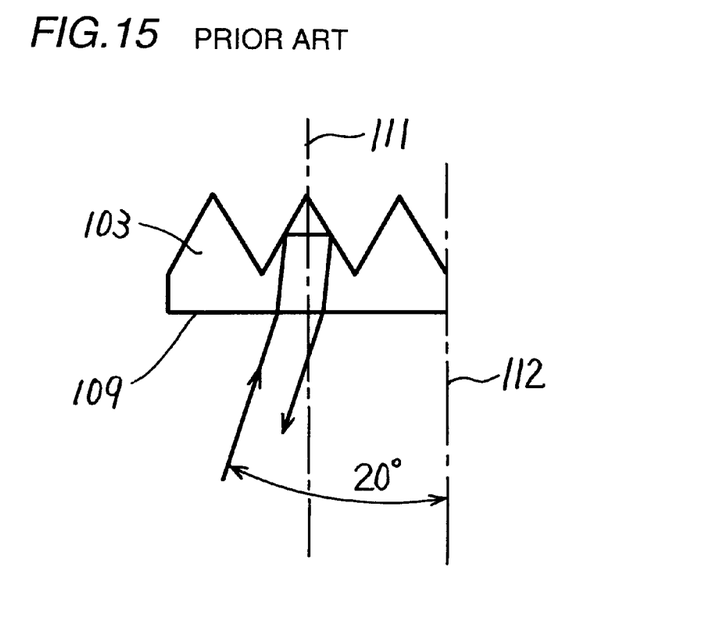
FIG. 15 is an illustration showing the structure of the conventional delineator.

FIG. 15 is a cross section showing the mechanism of light reflection of delineator 300. Referring to the figure, delineator 300 has a plurality of reflex reflecting elements 103 therein. Reflex reflecting element 103 is a cubic corner element formed of a transparent acrylic resin, for example. As denoted by the arrows in the figure, the light beam entering through mirror finished surface portion 109 is reflected by the surfaces of reflex reflecting element 103 and output in the direction opposite to the incident direction.

Figure 16:
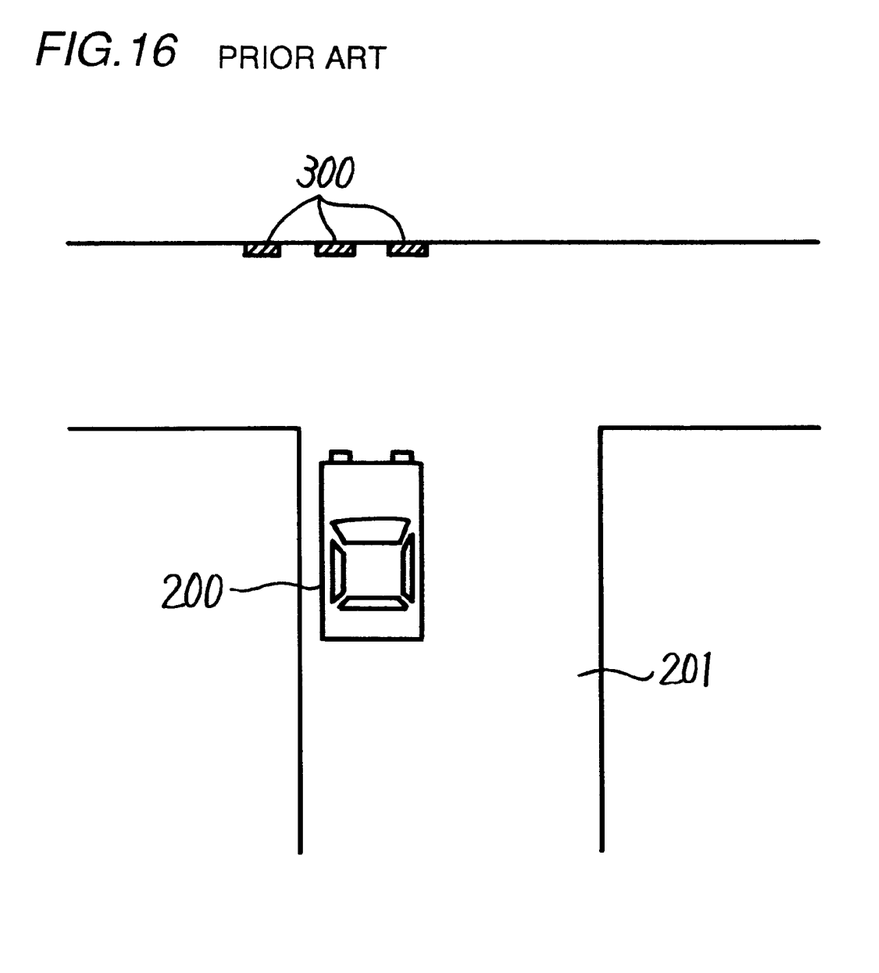
FIG. 16 is an illustration showing delineators 300 attached on a T intersection.

FIG. 16 is a plan view showing such delineators 300 attached on the road 201. In this example, delineators 300 are attached at a T intersection of the road 201. Light beams from the head lamp of a vehicle 200 coming near to the T intersection are reflected by delineators 300. This helps the driver of vehicle 200 to notice the existence of the wall ahead.

Figure 17:
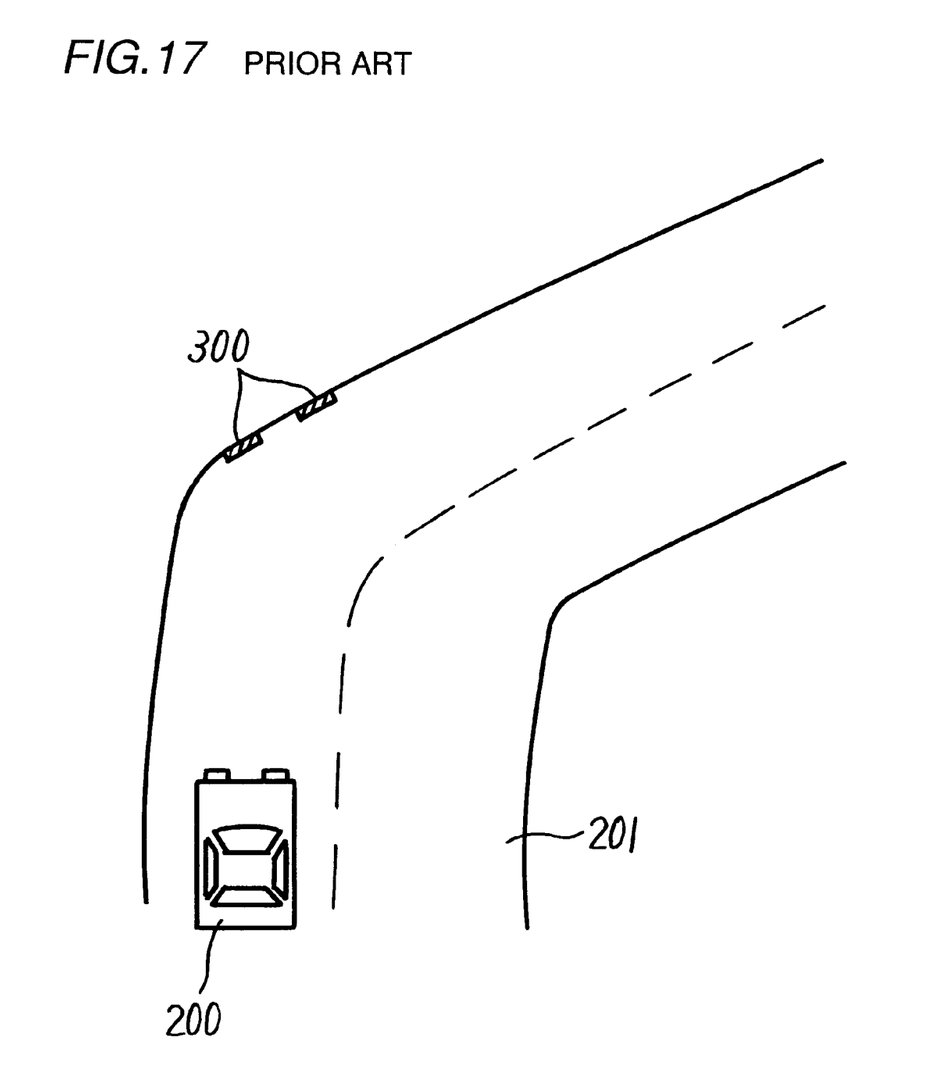
FIG. 17 is an illustration showing delineators 300 attached at a sharp curve of the road 201.

Similarly, at a sharp curve of the road 201 such as shown in FIG. 17, the driver notices the curve as the light beams from the headlight of vehicle 200 are reflected.

The conventional delineator, however, suffers from the following problem.

Figure 18:
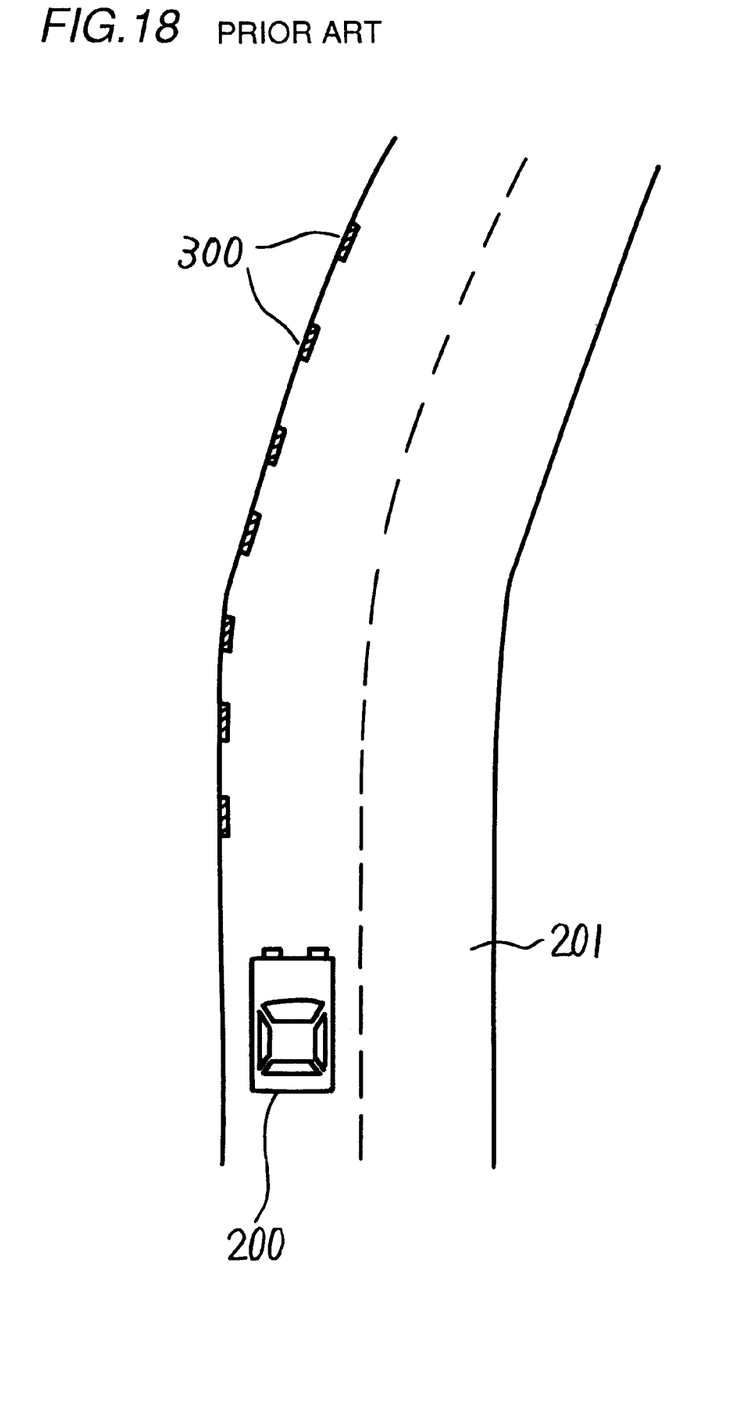
FIG. 18 is an illustration showing delineators 300 attached on a moderate curve of the road 201.

Referring to FIG. 18, if the road 201 curves moderately (or if the road 201 runs straight), the light beams from the headlight of a running vehicle 200 cannot be reflected by delineator 300 even when delineator 300 is attached to the sidewall or a guardrail along the road, as the effective incident angle of the delineator is as narrow as ±20°, as described with reference to FIG. 14.

Figure 19:
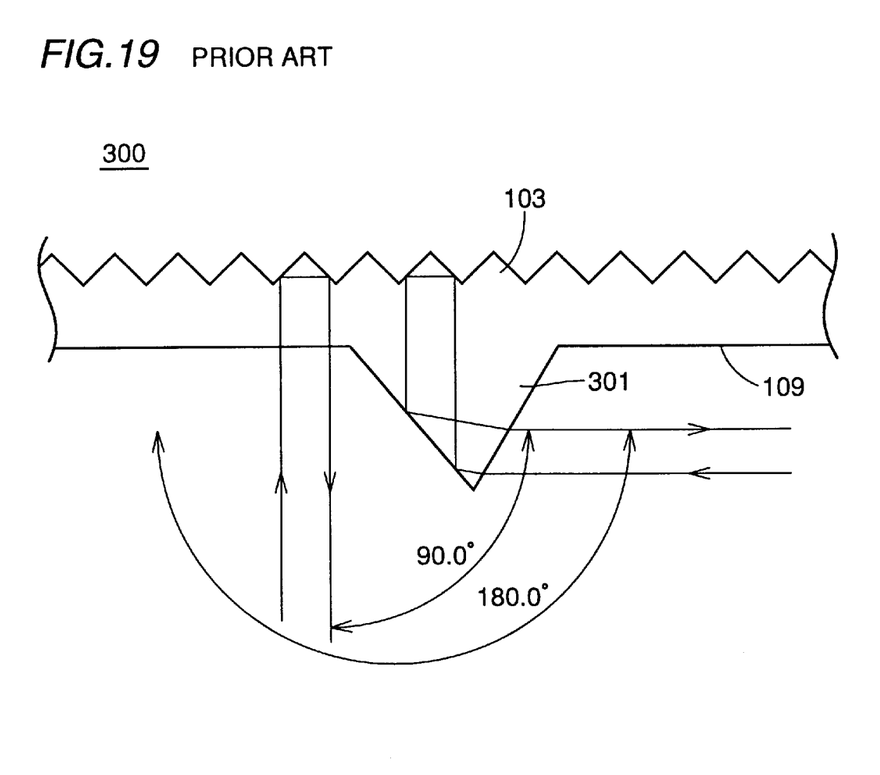
FIG. 19 is an illustration showing the structure of a conventional improved delineator.

A delineator having such a structure as shown in FIG. 19 has been known as a solution of the above described problem, which is capable of reflecting light beams from the vehicle even at a moderate curve or straight road.

Referring to FIG. 19, delineator 300 includes, in addition to reflex reflecting elements 103 arranged parallel to each other on mirror finished surface portion 109, a projection 301 on the side of mirror finished surface portion 109. Because of this projection 301, a light beam proceeding parallel to mirror finished surface portion 109 is reflected by reflex reflecting element 103 through projection 301, and again reflected through projection 301 to the direction opposite to the incident direction. Accordingly, not only the light beams entering perpendicularly but also light beams proceeding parallel to the mirror finished surface portion 109 can effectively be reflected.

However, in such a delineator, not all of the light beams entering from a direction parallel to the mirror finished surface portion 109 are reflected by projection 301, and some of the light beams are transmitted through projection 301. As a result, intensity of the reflected light beams is low.

SUMMARY OF THE INVENTION

The present invention was made to solve the above described problems and its object is to provide a delineator which can be readily noticed by the driver even if the road runs straight or curves moderately.

The above described object is attained by a delineator in accordance with an aspect of the present invention attached to an object existing along a road, which includes a deflecting portion having a plurality of reflex reflecting elements for reflecting incident light beams in a direction opposite to the incident direction, with a refracting surface of the reflecting portion and an optical axis of the reflex reflecting element being inclined in the direction to which the road leads.

According to another aspect of the present invention, the delineator attached to an object existing along the road includes a plurality of reflecting portions and a base having a surface on which the plurality of reflecting portions are attached side by side, each of the plurality of reflecting portions having a reflex reflecting element, and refracting surface of the plurality of reflecting portions being inclined from the surface on which the reflecting portions are attached side by side.

Preferably, the plurality of reflecting portions include a first reflecting portion attached with its refracting surface inclined in a first direction with respect to the surface on which the reflecting portions are attached side by side, and a second reflecting portion attached with its refracting surface inclined in the direction opposite to the first direction with respect to the surface on which the reflecting portions are attached side by side.

More preferably, the first and second reflecting portions are different in color with each other.

More preferably, the reflex reflecting element included in each of the reflecting portion has its optical axis inclined in the same direction of inclination as the refracting surface.

More preferably, said base includes a guardrail.

More preferably, the base includes a double sided adhesive tape.

More preferably, the plurality of reflecting portions are attached on the base by a rail member.

According to the invention, the direction in which the delineator reflects light beams can be inclined, and therefore a delineator which can be easily noticed by the driver even if the road is straight or curves moderately can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figures 1A, 1B:
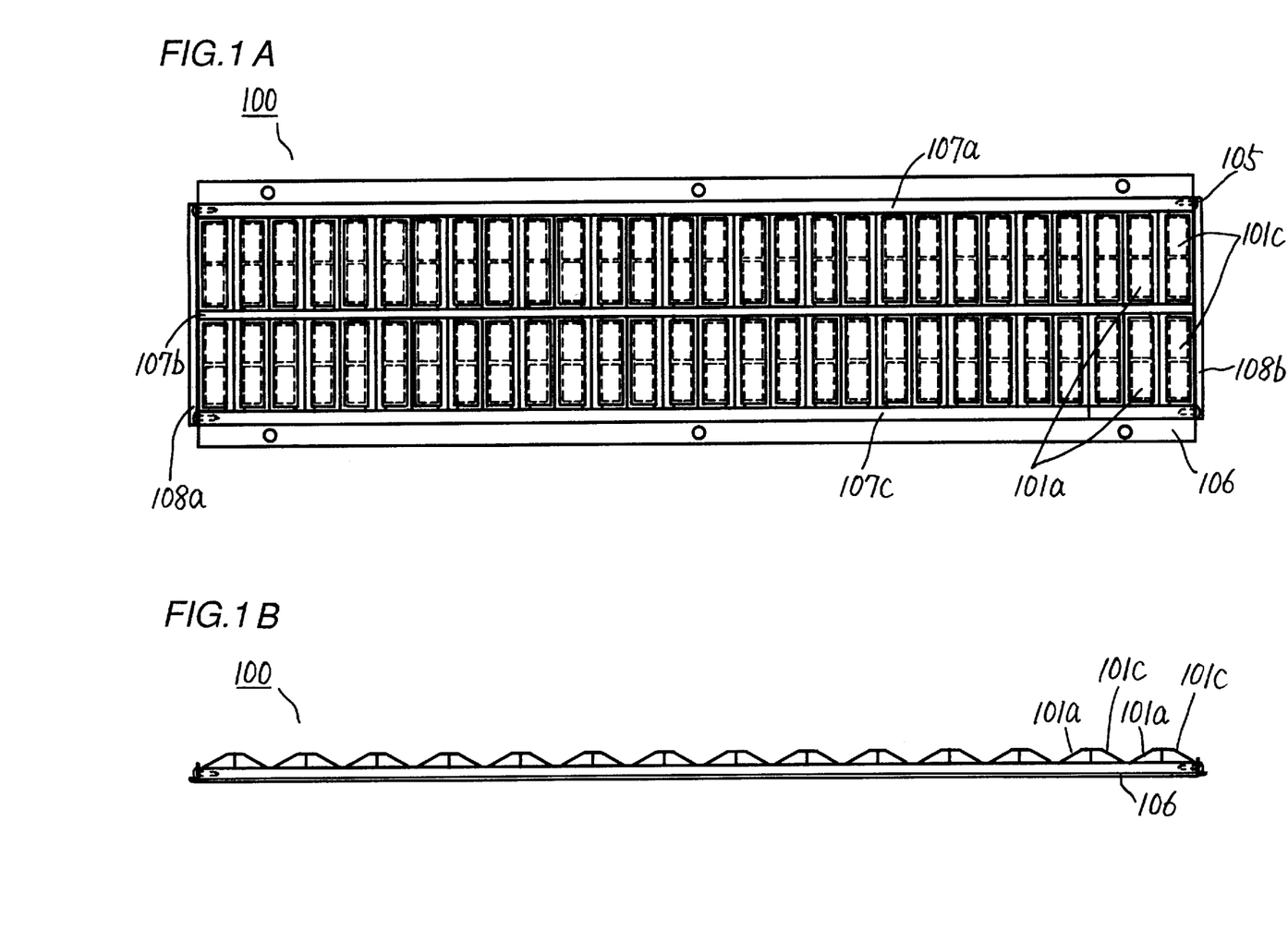
FIGS. 1A and 1B are a front view and a bottom view of the delineator in accordance with the first embodiment of the present invention.
Figure 2:
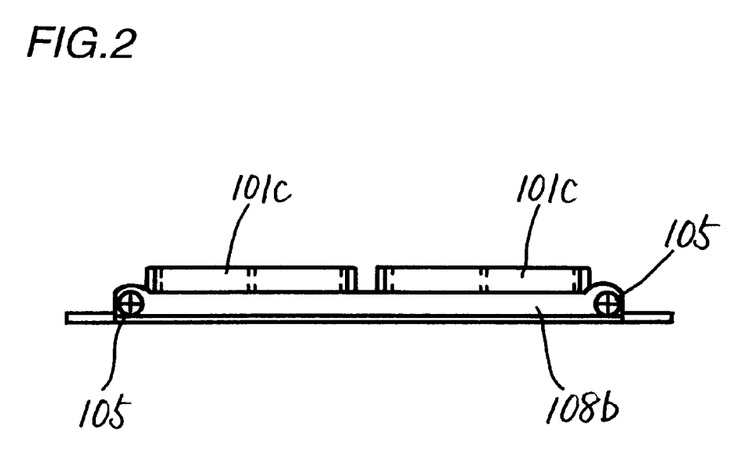
FIG. 2 is a side view of the delineator shown in FIG. 1.

FIGS. 1A and 1B are a front view and a bottom view of delineator 100 in accordance with the first embodiment of the present invention, respectively, and FIG. 2 is a side view of delineator 100.

Referring to the figures, delineator 100 includes, mainly, an aluminum base 106, 28 colorless transparent reflectors 101c, and 28 amber transparent reflectors 101a.

Aluminum base 106 has rail members 107a to 107c formed thereon, and each of the reflectors 101a and 101c has a projection 104 (which will be described later). Reflectors 101a and 101c are attached to aluminum base 106 by projections 104 engaging with rail members 107a to 107c. In order to prevent reflectors 101a and 101c from slipping out from rail members 107a to 107c, stoppers 108a and 108b are fixed by screws 105 at terminating portions of rail members 107a to 107c.

Each of the plurality of reflectors 101a and 101c has a refracting surface. Reflecting surfaces of colorless transparent reflectors 101c are formed to be inclined in one direction with respect to that surface of the aluminum base 106 on which rail members 107a to 107c are formed. Reflecting surfaces of amber transparent reflectors 101a are formed to be inclined in a direction opposite to the direction of the refracting surfaces of colorless transparent reflectors 101c.

Figure 3A:
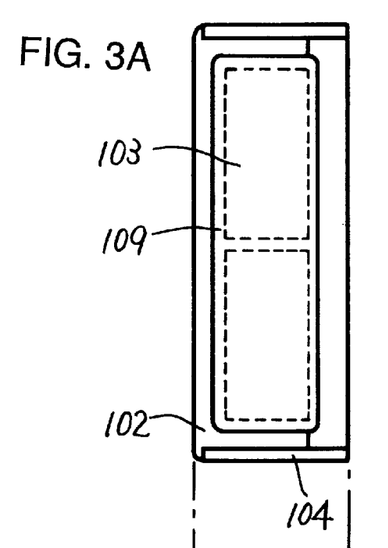
FIGS. 3A to 3C are a front view, a bottom view and a side view of one of reflectors 101a and 101c of FIG. 1.
Figure 3B:
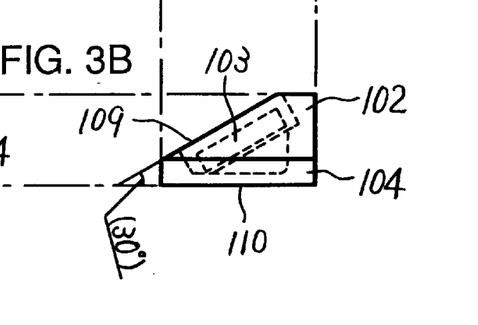
Figure 3C:
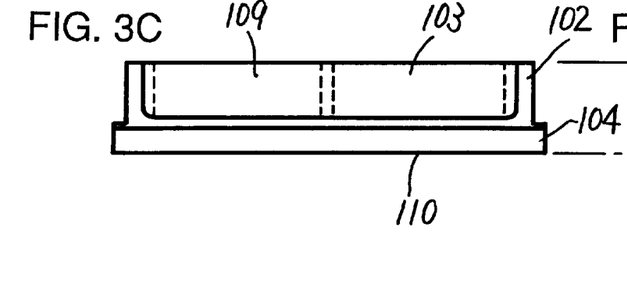

FIGS. 3A to 3C show a structure of one of the reflectors 101a and 101c in which FIG. 3A is a front view, 3B is a bottom view and FIG. 3C is a side view. Reflector 101a or 101c has a plastic body 102 and a reflex reflecting element 103 attached on body 102 by ultrasonic welding. Body 102 has the above described projection 104, which engages with the rail members 107a to 107c of aluminum base 106.

The surface on which reflex reflecting element 103 is mounted provides the refracting surface 109. Refracting surface 109 is adapted to form an angle of about 30° with that surface 110 of the reflector which is attached to the aluminum base.

The refracting surface of clear transparent reflector 101c is colorless, while the refracting surface of amber transparent reflector 101a is amber, and therefore the light beam reflected therefrom is amber.

Figure 4:
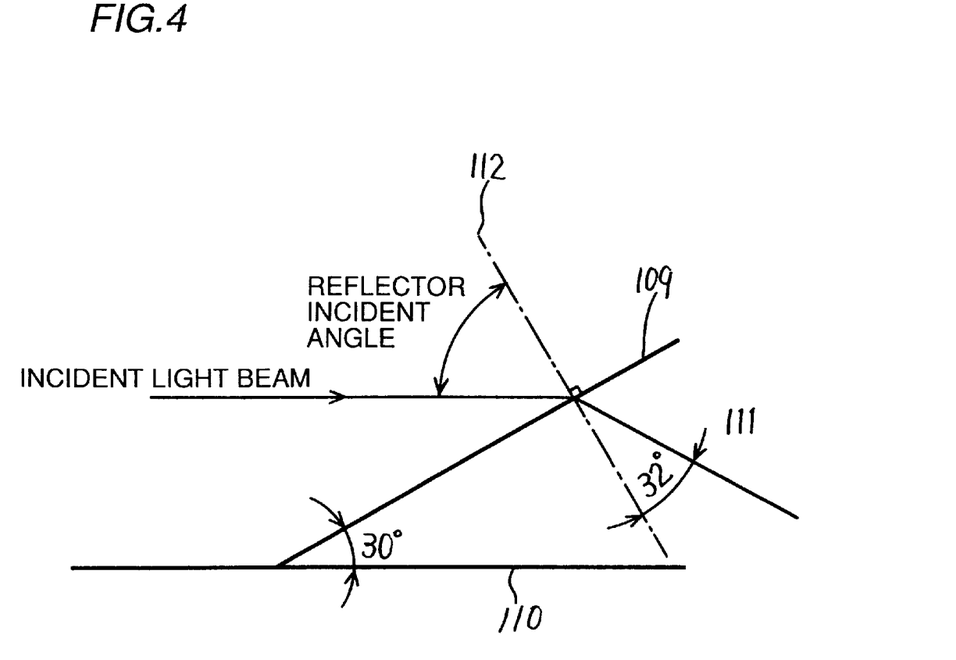
FIG. 4 shows a relation between refracting surface 109 of a reflector and an optical axis 111 of the reflex reflecting element.

FIG. 4 shows relation between refracting surface 109 of the reflector and an optical axis 111 of the reflex reflecting element.

As already described, the surface 110 of the reflector facing aluminum base and refracting surface 109 of the reflector form an angle of 30°. Optical axis 110 of the reflex reflecting element is adapted to form an angle of 32° in the direction of inclination of refracting surface 109 from perpendicular 112 of the refracting surface 109.

Figure 6:
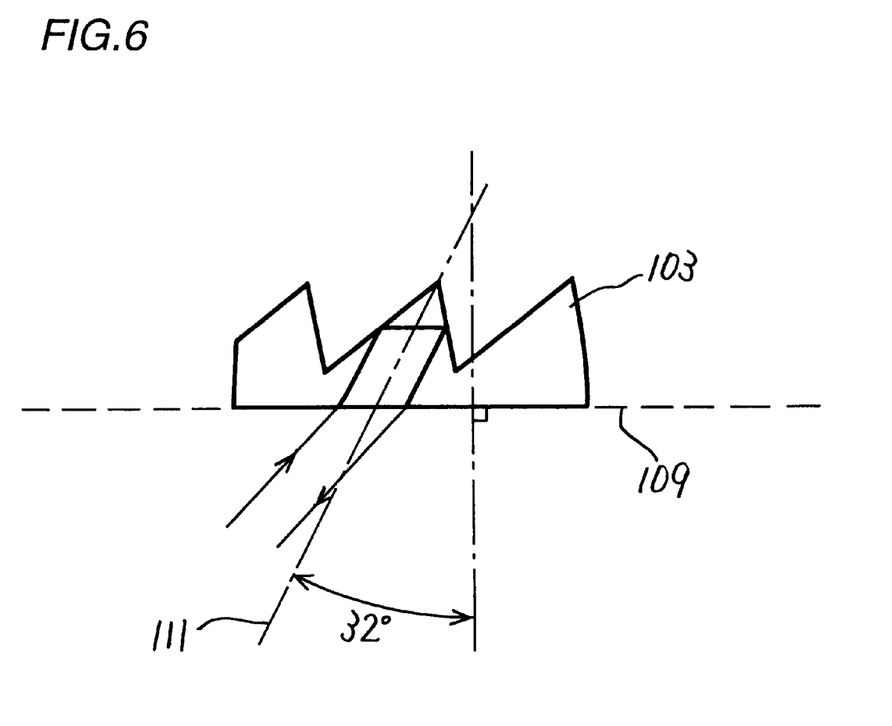
FIG. 6 is an illustration showing principle of inclining the optical axis of the reflex reflecting element.

More specifically, the optical axis is inclined by tilting each common reflex reflecting element shown in FIG. by 32° as shown in FIG. 6.

Figure 5:
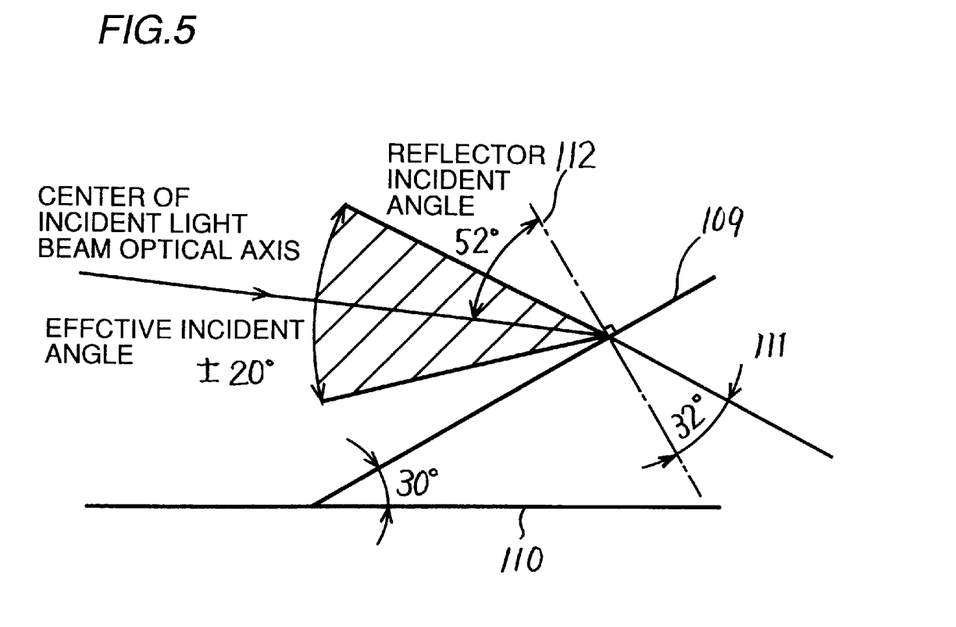
FIG. 5 is an illustration of the effective incident angle of the delineator shown in FIG. 1.

This structure provides the effective incident angle of ±20° on both sides of a direction inclined by 52° from perpendicular 112 of the refracting surface, as shown in FIG. 5. Accordingly, light beams entering parallel to the surface 110 attached to the aluminum base can also be reflected.

Figure 7:
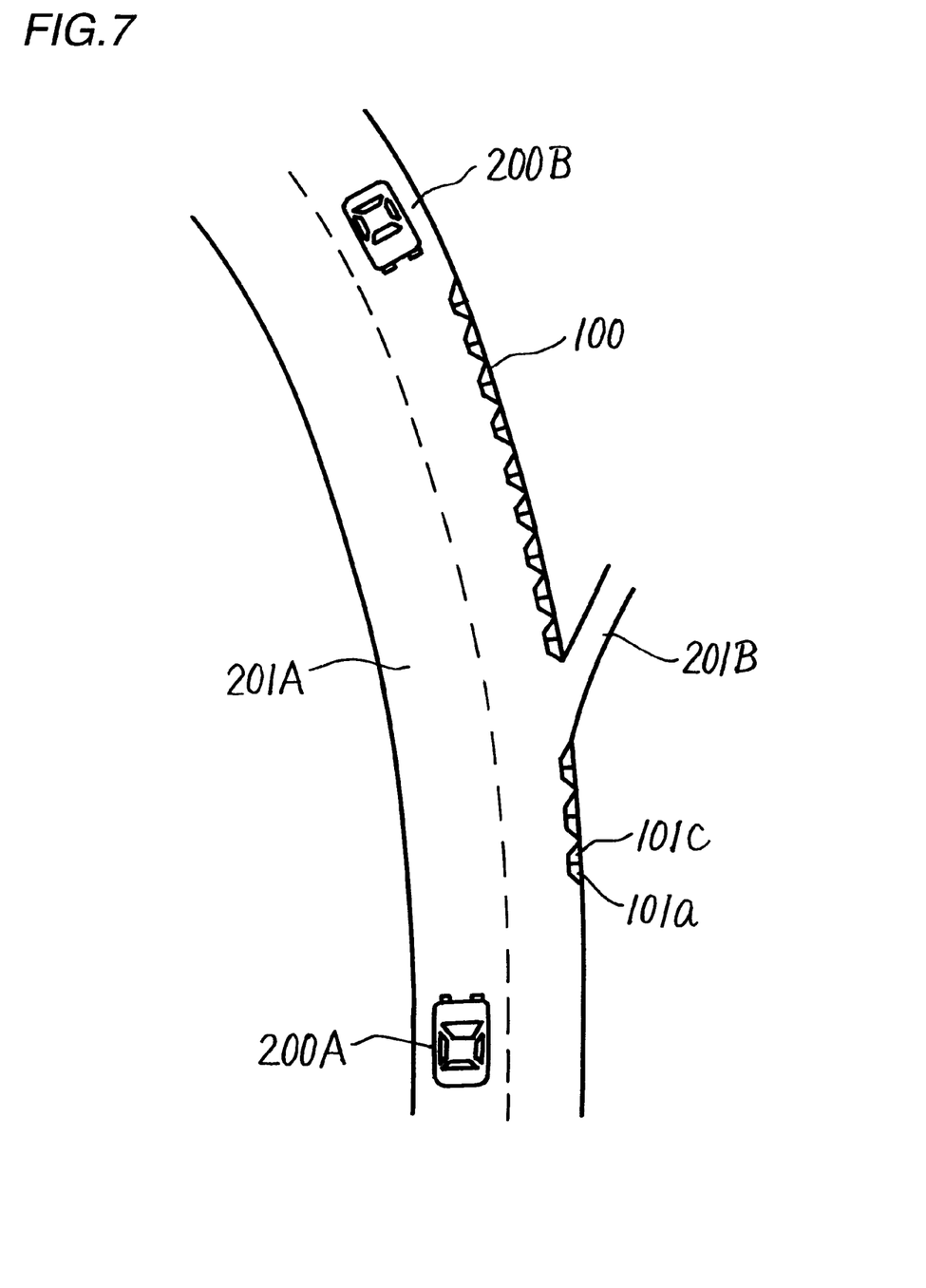
FIG. 7 is a plan view showing an example where delineators 100 are attached on the road 201A.

FIG. 7 shows delineators 100 in accordance with the present embodiment attached on a sidewall or a guardrail of road 201A.

Figure 8:
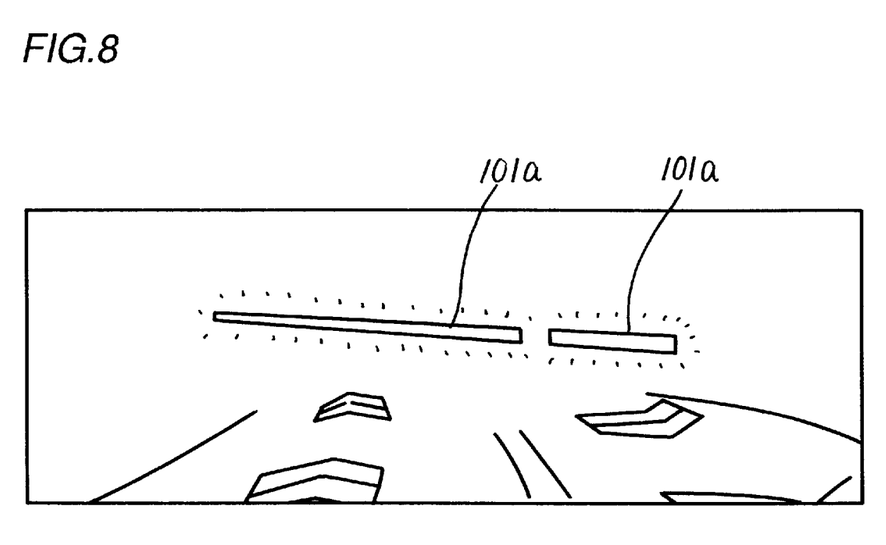
FIG. 8 is a view from the driver of the vehicle 200A shown in FIG. 7.

Light beams from a headlamp of a vehicle 200A on a traffic lane opposite to the side where delineators 100 are attached are reflected by the amber reflectors 110a. Therefore, the driver of vehicle 200A notices light beams reflected from amber reflectors 110a through the windshield, as shown in FIG. 8. Thus the driver comes to know the position of the wall or the guardrail.

Further, as reflectors 101a and 101c of delineators 100 in accordance with the present invention are attached continuously on aluminum base 106, the reflected light beams are recognized by the driver as continuous light beams as shown in FIG. 8. Therefore, there is noticed a disconnection of the light beams where the delineator is not provided (for example, entrance to a branch 201B in FIG. 7). Thus the driver notices that there is an entrance to the branch at that portion.

Figure 9:
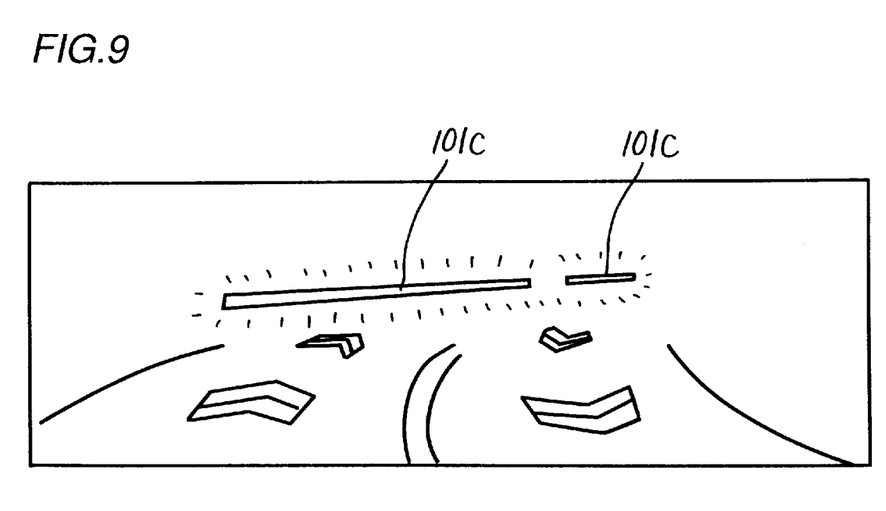
FIG. 9 is a view from the driver of vehicle 200B shown in FIG. 7.

Meanwhile, referring to FIG. 7, the driver of vehicle 200B on the traffic lane on the side where delineators 100 are provided sees the view shown in FIG. 9 through the windshield. More specifically, the driver comes to know the position of the wall or the guardrail by the reflected beams from colorless transparent reflectors 101C.

As described above, light beams reflected from the delineator in accordance with the present embodiment have different colors dependent on the direction of running of the vehicle, and therefore the driver can advantageously recognize the direction of the curve of the road. The reflectors may have the same colors, however, if the delineator is provided only to give notice of the guardrail or wall position to the driver.

Second Embodiment

Figure 10:
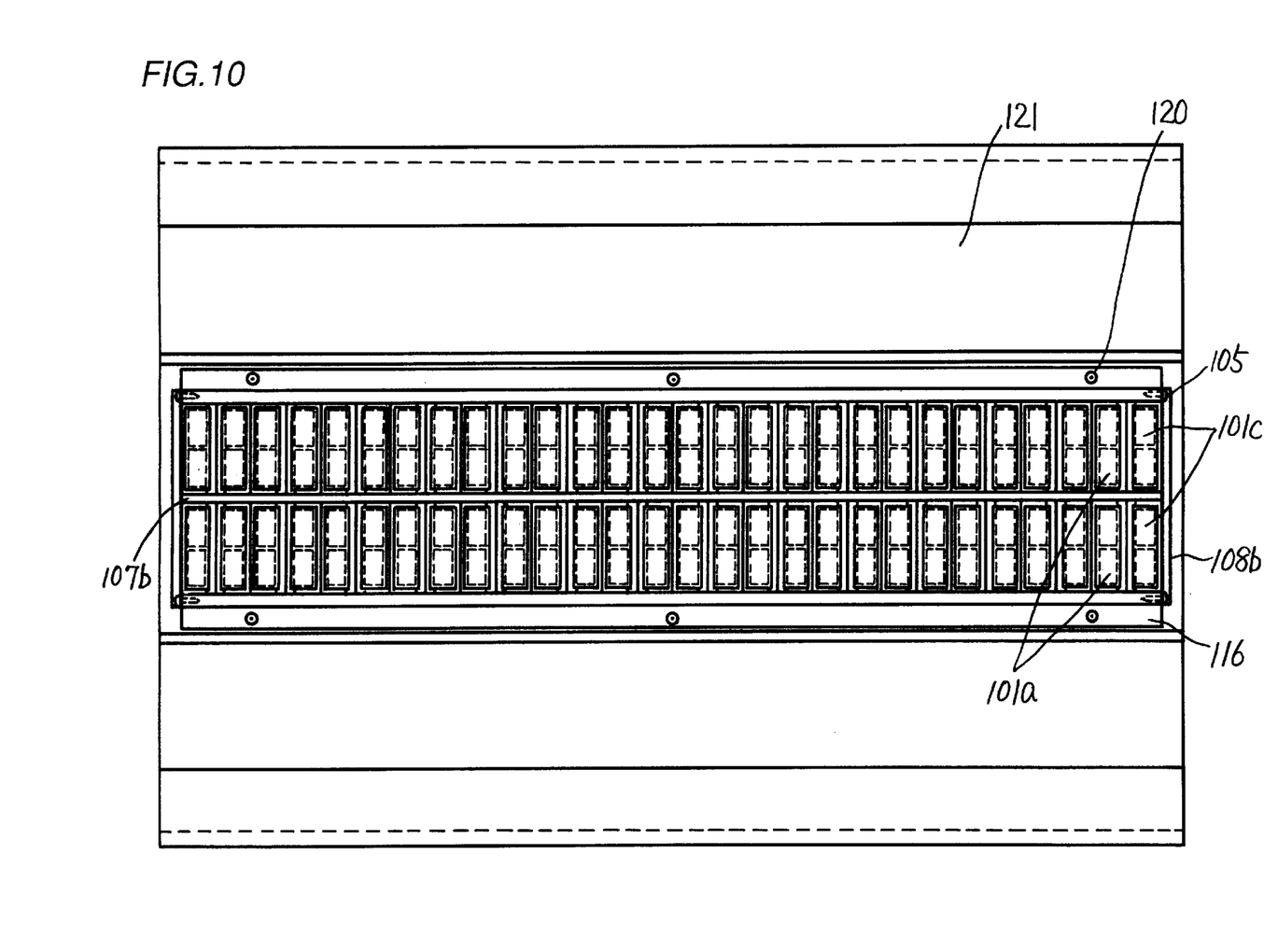
FIG. 10 is a front view of the delineator in accordance with the second embodiment of the present invention.
Figure 11:
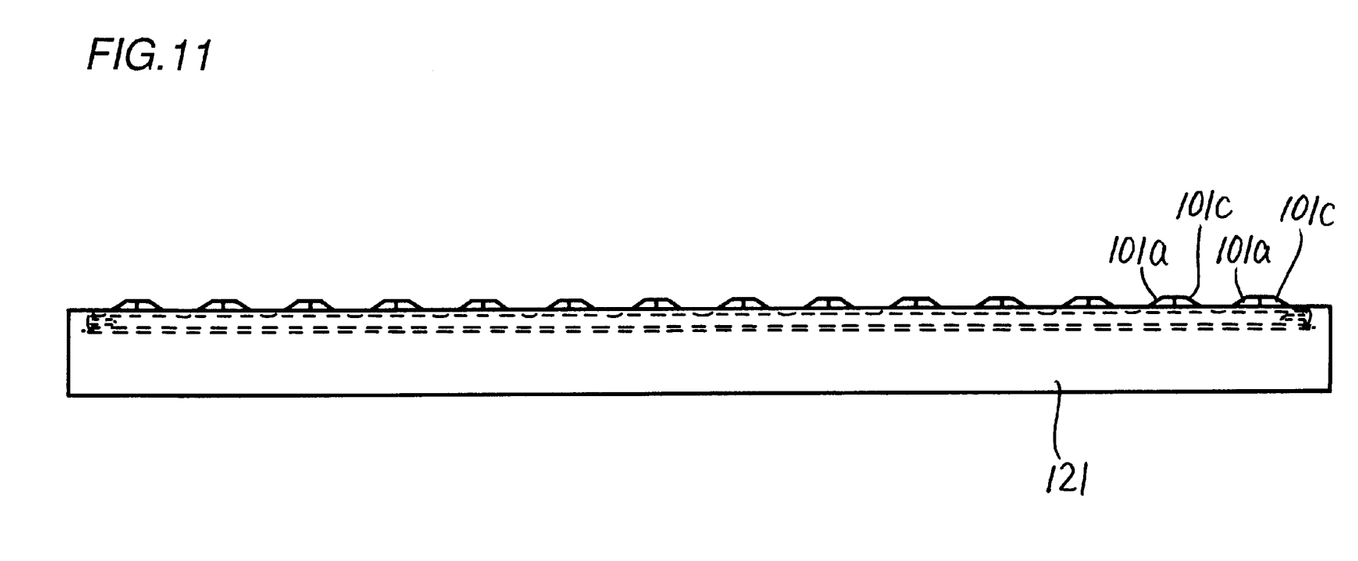
FIG. 11 is a bottom view of the delineator shown in FIG. 10.
Figure 12:
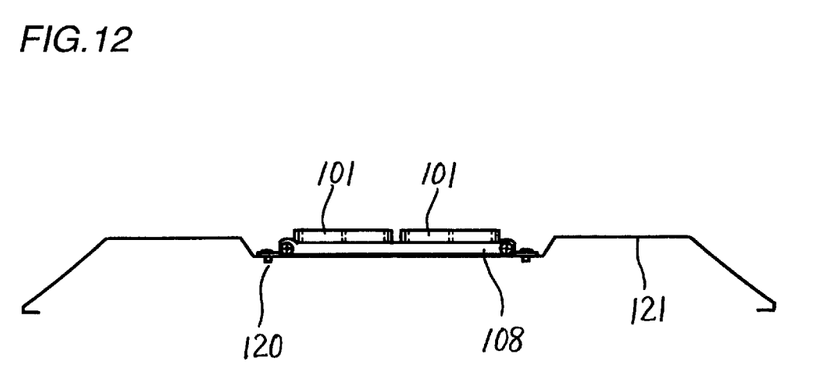
FIG. 12 is a side view of the delineator shown in FIG. 10.

FIG. 10 is a front view of the delineator in accordance with the second embodiment of the present invention, FIG. 11 is a bottom view and FIG. 12 is a side view thereof, respectively.

Referring to the figure, the delineator in accordance with the present embodiment has the delineator in accordance with the first embodiment mounted on a recessed portion of an iron frame plate 121 having the shape of a guardrail, by means of rivets 120.

The angle formed by the surface 110 (FIG. 4) of the reflector facing the aluminum base and the refracting surface 109 of reflector 101 of the delineator in accordance with the first embodiment is as moderate as 30°. Therefore, even when such a delineator is mounted on a recessed portion of a guardrail, reflectors 101a and 110c are not extremely protruded from the recessed portion (see FIGS. 11 and 12). This is because the optical axis of the reflex reflecting element is also inclined in the same direction as the refracting surface.

Third Embodiment

Figure 13A:
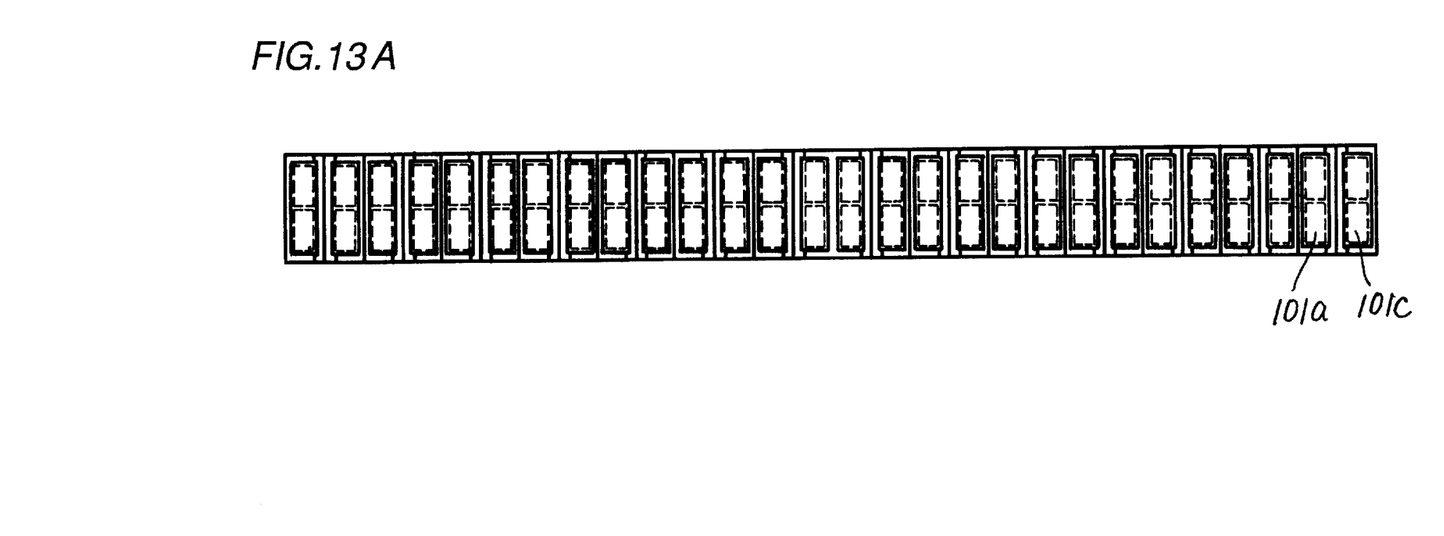
FIGS. 13A and 13B are a front view and a bottom view of the delineator in accordance with the third embodiment of the present invention, respectively.
Figure 13B:
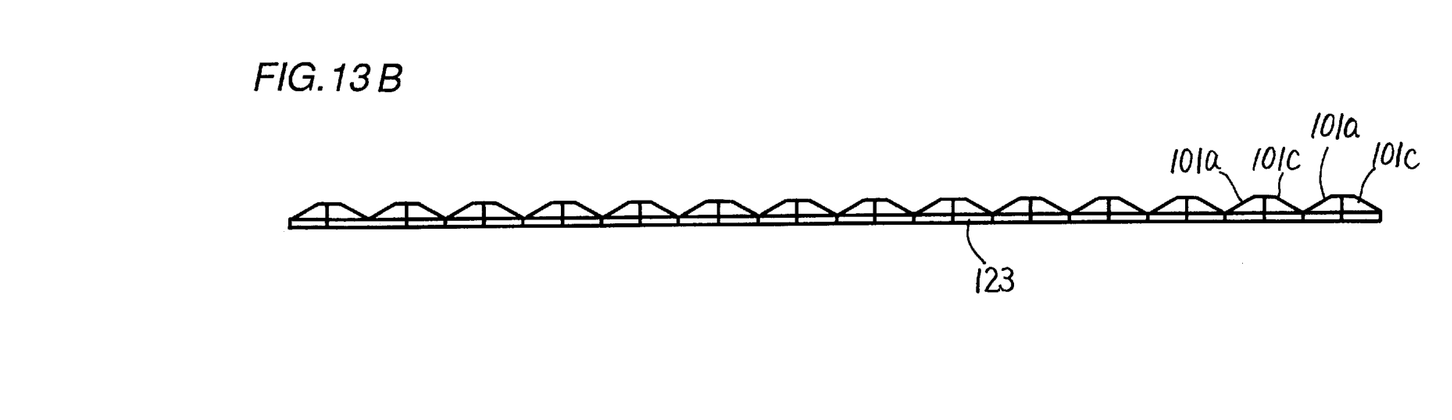

FIGS. 13A and 13B are a front view and a bottom view of the delineator in accordance with the third embodiment of the present invention, respectively.

In the present embodiment, reflectors 101a and 101c employed in the first and second embodiments are adhered on a double sided adhesive tape 123. This facilitates attachment of the delineator along the curve of the road.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A delineator attached on an object existing along a road, comprising:

a plurality of reflecting portions; and a base having a surface on which said plurality of reflecting portions are attached;

wherein each of said plurality of reflecting portions consisting of a single material having a reflex reflecting element, and a refracting surface of respective ones of said plurality of reflecting portions is inclined from said surface on which the reflecting portions are attached.

2. The delineator according to claim 1, wherein said plurality of reflecting portions include a first reflecting portion having a refracting surface inclined in a first direction with respect to said surface on which the reflecting portions are attached, and a second reflecting portion having a refracting surface attached inclined in a direction opposite to said first direction with respect to said surface on which the reflecting portions are attached.

3. The delineator according to claim 2, wherein said first and second reflecting portions have different colors from each other.

4. The delineator according to claim 3, wherein the reflex reflecting element included in each of said reflecting portions has an optical axis inclined in the direction of inclination of said refracting surface.

5. The delineator according to claim 2, wherein the reflex reflecting element included in each of said reflecting portions has an optical axis inclined in the direction of inclination of said refracting surface.

6. The delineator according to claim 1, wherein the reflex reflecting element included in each of said reflecting portions has an optical axis inclined in the direction of inclination of said refracting surface.

7. The delineator according to claim 1, wherein said base includes a guardrail.

8. The delineator according to claim 1, wherein said base includes a double sided adhesive tape.

9. The delineator according to claim 1, wherein said plurality of reflecting portions are attached on said base by a rail member means formed on the base.

10. The delineator according to claim 9, wherein each of said reflecting portion includes a projection which is constructed and arranged to engage with the rail member means.

11. The delineator according to claim 10, wherein stoppers are fixed at terminating portions of the rail member means to prevent the reflecting portions from disengaging from the rail member means.

* * * * *